US006902179B1

United States Patent
Jolly

(10) Patent No.: US 6,902,179 B1
(45) Date of Patent: Jun. 7, 2005

(54) COLLAPSIBLE BOAT TRAILER SYSTEM

(76) Inventor: Charles Richard Jolly, 11140 4th St. East, Isla Palms, Treasure Island, FL (US) 33706

( * ) Notice: Subject to any disclaimer, the term of this patent is extended or adjusted under 35 U.S.C. 154(b) by 0 days.

(21) Appl. No.: 10/635,589

(22) Filed: Aug. 6, 2003

(51) Int. Cl.$^7$ .............................................. B62D 63/00
(52) U.S. Cl. ..................... 280/414.1; 280/639; 280/656
(58) Field of Search .................... 280/414.1, 415.1, 280/491.1, 401, 639, 656, 491.3, 475, 491.4, 638, 42; 403/79

(56) References Cited

U.S. PATENT DOCUMENTS

| | | | | | |
|---|---|---|---|---|---|
| 2,608,418 A | * | 8/1952 | Finlayson et al. | ............ | 280/42 |
| 3,554,394 A | * | 1/1971 | Hedman | ..................... | 414/350 |
| 3,574,388 A | * | 4/1971 | Stone | ......................... | 296/168 |
| 3,989,264 A | * | 11/1976 | Lovendahl | .................. | 280/401 |
| 4,362,316 A | * | 12/1982 | Wright | ......................... | 280/656 |
| 5,570,898 A | * | 11/1996 | Albert | ......................... | 280/656 |
| 5,590,997 A | * | 1/1997 | Fredriksson et al. | ........ | 414/541 |
| 5,924,836 A | * | 7/1999 | Kelly | ........................... | 414/482 |
| 6,685,209 B1 | * | 2/2004 | Guio | ........................ | 280/414.1 |

FOREIGN PATENT DOCUMENTS

| | | | | |
|---|---|---|---|---|
| DE | 4132646 A1 | * | 4/1993 | ............. B62B/5/00 |
| DE | 29609799 U1 | * | 10/1997 | ............. B60P/3/10 |

\* cited by examiner

*Primary Examiner*—Lesley D. Morris
*Assistant Examiner*—Daniel Yeagley
(74) *Attorney, Agent, or Firm*—Edward P. Dutkiewicz

(57) ABSTRACT

A trailer has parallel rearward rails and a pair of angled forward rails and a pair of angled intermediate rails. A pair of similarly configured hinge assemblies couple the forward rails and the intermediate rails. Each hinge assembly includes upwardly extending wings on each intermediate rail with a bolt there between and with a hall positioned on the bolt between the wings. The hinge has a cylinder with a cylindrical opening secured to each forward rail. Each hinge assembly has a connecting element with an annular collar pivotably received on the ball of the adjacent rearward rail. A pin extends into the cylindrical opening whereby the forward rails may pivot with respect to the intermediate rails of the forward section.

7 Claims, 4 Drawing Sheets

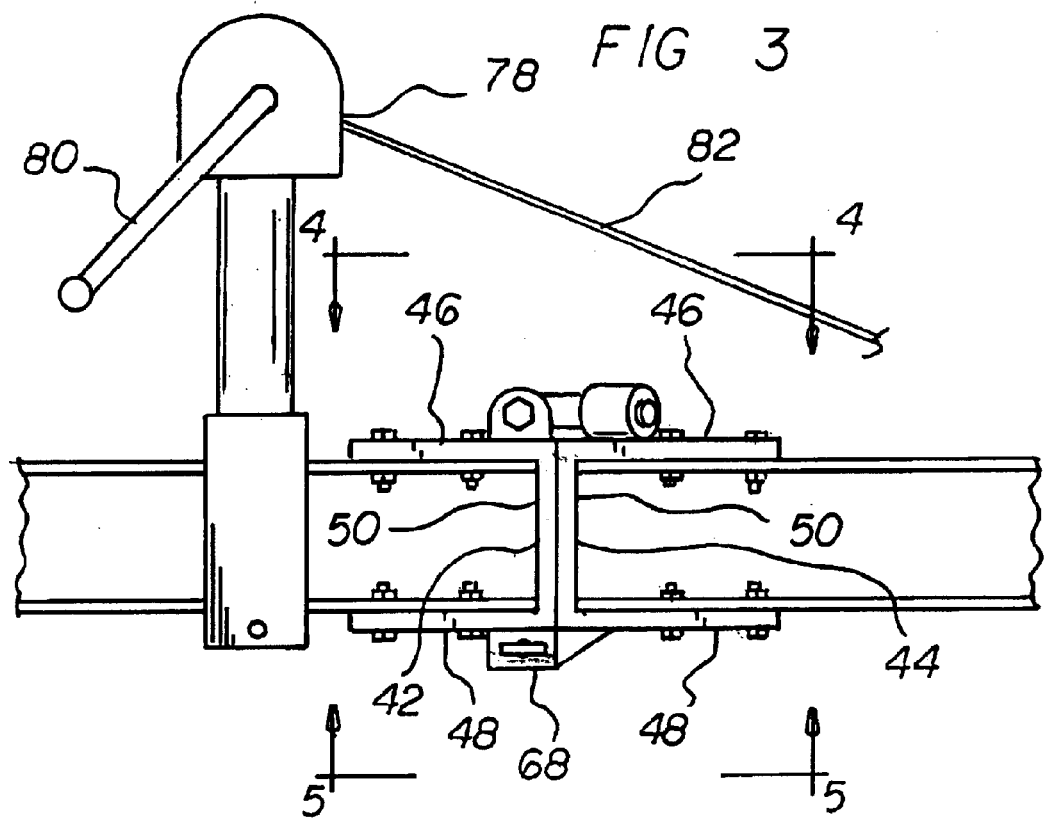
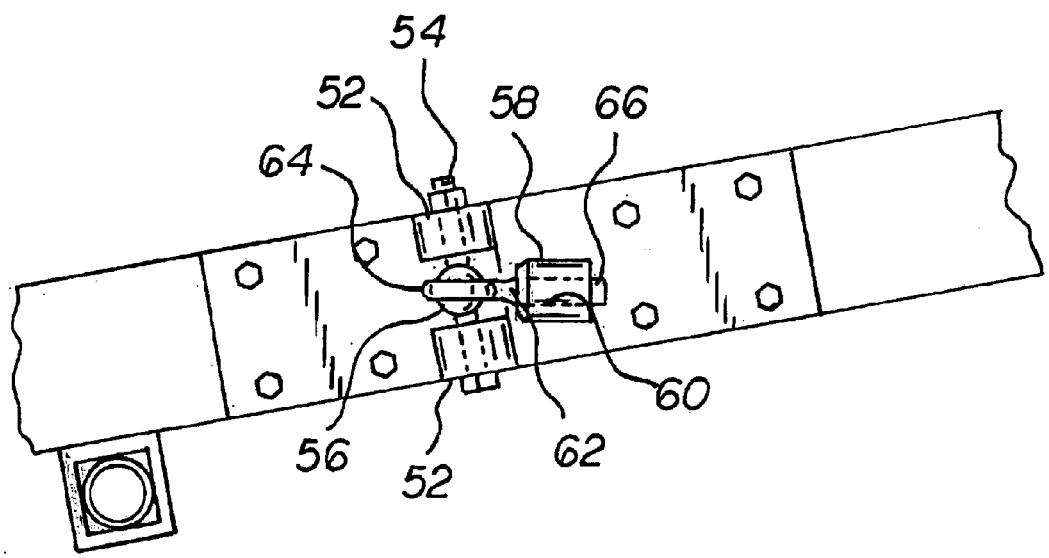

COLLAPSIBLE BOAT TRAILER SYSTEM

BACKGROUND OF THE INVENTION

1. Field of the Invention

The present invention relates to a collapsible boat trailer system and more particularly pertains to allowing a user to safely and conveniently reconfigure a boat trailer to a reduced size as for storage purposes.

2. Description of the Prior Art

The use of boat trailer systems of known designs and configurations is known in the prior art. More specifically, boat trailer systems of known designs and configurations previously devised and utilized for the purpose of utilizing and storing boat trailers are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,570,898 issued Nov. 5, 1996, to Albert discloses a folding trailer. U.S. Pat. No. 4,362,316 issued Dec. 7, 1982, to Wright discloses a folding trailer. U.S. Pat. No. 4,239,258 issued Dec. 16, 1980 to Burris discloses a fold-up trailer assembly. Finally, U.S. Pat. No. 3,979,133 issued Sep. 7, 1976, to Morris discloses a foldable trailer.

While these devices fulfill their respective, particular objectives and requirements, the aforementioned patents do not describe a collapsible boat trailer system that allows a user to safely and conveniently reconfigure a boat trailer to a reduced size as for storage purposes.

In this respect, the collapsible boat trailer system according to the present invention substantially departs from the conventional concepts and designs of the prior art, and in doing so provides an apparatus primarily developed for the purpose of allowing a user to safely and conveniently reconfigure a boat trailer to a reduced size as for storage purposes.

Therefore, it can be appreciated that there exists a continuing need for a new and improved collapsible boat trailer system which can be used for safely and conveniently reconfiguring a boat trailer to a reduced size as for storage purposes. In this regard, the present invention substantially fulfills this need.

SUMMARY OF THE INVENTION

In view of the foregoing disadvantages inherent in the known types of boat trailer systems of known designs and configurations now present in the prior art, the present invention provides an improved collapsible boat trailer system. As such, the general purpose of the present invention, which will be described subsequently in greater detail, is to provide a new and improved collapsible boat trailer system and method which has all the advantages of the prior art and none of the disadvantages.

To attain this; the present invention essentially comprises First provided is a trailer. The trailer has a rearward section formed of parallel rearward rails and with parallel supports there above for receiving thereon a hull of a boat to be transported. Wheels are provided beneath the rearward section for transportation purposes.

The trailer also has a forward section in a V-shaped configuration terminating in an apex. The forward section is formed of a pair of angled forward rails and a pair of angled intermediate rails coupling the rearward rails and forward rails.

A downward projection extends from the forward rails for support purposes and an upward projection extends from the forward rails for boat-coupling purposes. A forward projection extends from the forward rails for vehicle-coupling purposes.

The trailer has a forward end. The forward projection is adjacent the forward end. The trailer also has a rearward end. The parallel supports are adjacent the rearward end.

Next provided is a pair of similarly configured hinge assemblies. The hinge assemblies couple the forward rails and the intermediate rails respectively. Each hinge assembly includes a U-shaped channel at the forward end of each intermediate rail and a U-shaped channel at the rearward end of each forward rail. Each U-shaped channel has a horizontal upper piece and a parallel lower piece with a vertical coupling piece there between. The coupling piece of each intermediate rail is in facing contact with the associated coupling piece of earn forward rail when the trailer is configured for operation and use. Each hinge assembly has upwardly extending wings on the upper piece of each intermediate rail with a bolt there between and with a ball positioned on the bolt between the wings. The hinge also includes a cylinder secured to the upper piece of each forward rail. Each cylinder has a cylindrical opening there through with an axis parallel with the axis of the rearward rail there adjacent. Each hinge assembly also has a connecting element with an annular collar pivotably received on the ball of the adjacent rearward rail and with a pin extending into the cylindrical opening. In this manner the forward rails may pivot with respect to the intermediate rails of the forward section when moving between an operative orientation for transportation purposes and an inoperative orientation for storage purposes.

Next, a locking subassembly is provided. The locking subassembly includes a plurality of downwardly projecting spaced forward plates extending from each lower piece of each forward rail to a location beneath each lower piece of each intermediate rail. A plurality of downwardly projecting spaced rearward plates extend from each lower piece of each intermediate rail. The forward plates and rearward plates are interleaved when in the operative orientation. Apertures are provided through all of the plates. The apertures are in alignment when the trailer is in the operative orientation. The locking subassembly also includes a pin positionable through the apertures for locking the rails when in an operative orientation.

Finally, a removable winch is provided. When in use, the winch is secured to, and above, one intermediate rail. A handle is rotatable by a user. A cable couples the winch to an intermediate point of one of the forward rails to facilitate the movement of the rails between the operative orientation and the inoperative orientation by the rotation of the handle.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present Invention.

It is therefore an object of the present invention to provide a new and improved collapsible boat trailer system which has all of the advantages of the prior art boat trailer systems of known designs and configurations and none of the disadvantages.

It is another object of the present invention to provide a new and improved collapsible boat trailer system which may be easily and efficiently manufactured and marketed.

It is further an object of the present invention to provide a new and improved collapsible boat trailer system which is of durable and reliable constructions.

An even further object of the present invention is to provide a new and improved collapsible boat trailer system which is susceptible of a low cost of manufacture with regard to both materials and labor, and which accordingly is then susceptible of low prices of sale to the consuming public, thereby making such collapsible boat trailer system economically available to the buying public.

Even still another object of the present invention is to provide a collapsible boat trailer system for allowing a user to safely and conveniently reconfigure a boat trailer to a reduced size as for storage purposes.

Lastly, it is an object of the present invention to provide a new and improved trailer with parallel rearward rails and a pair of angled forward rails and a pair of angled intermediate rails. A pair of similarly configured hinge assemblies couple the forward rails and the intermediate rails. Each hinge assembly includes upwardly extending wings on each intermediate rail with a bolt there between and with a ball positioned on the bolt between the wings. The hinge has a cylinder with a cylindrical opening secured to each forward rail. Each hinge assembly has a connecting element with an annular collar pivotably received on the ball of the adjacent rearward rail. A pin extends into the cylindrical opening whereby the forward rails may pivot with respect to the intermediate rails of the forward section.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an enlarged side elevational view taken at circle 3 of FIG. 1.

FIG. 4 is a plan view of the hinge assembly shown in FIG. 3.

The same reference numerals refer to the same parts throughout the various Figures.

DESCRIPTION OF THE PREFERRED EMBODIMENT

Figure 1:
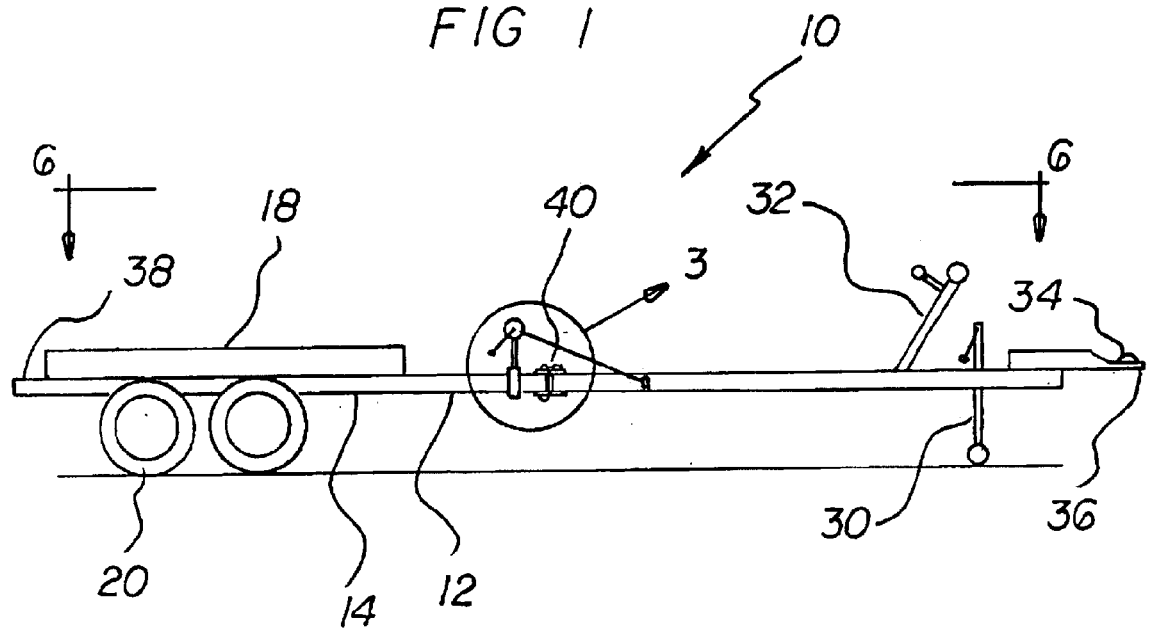
FIG. 1 is a side elevational view of the collapsible boat trailer system for allowing a user to safely and conveniently reconfigure a trailer system to a reduced size as for storage purposes.
Figure 2:
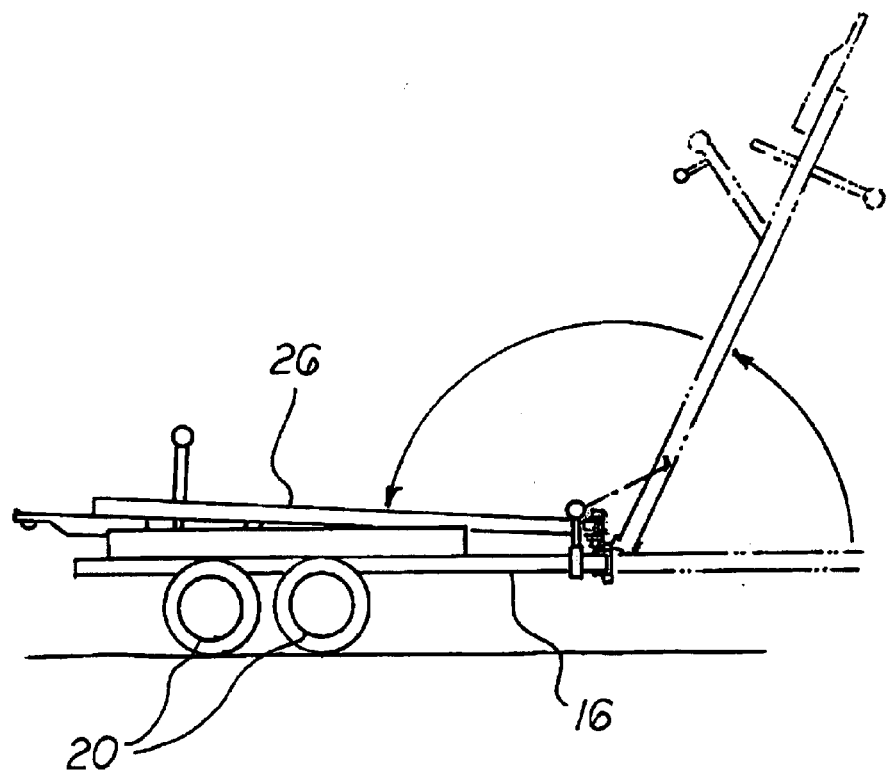
FIG. 2 is a side elevational view, similar to FIG. 1, but with the forward section pivoted as for storage purposes.
Figure 5:
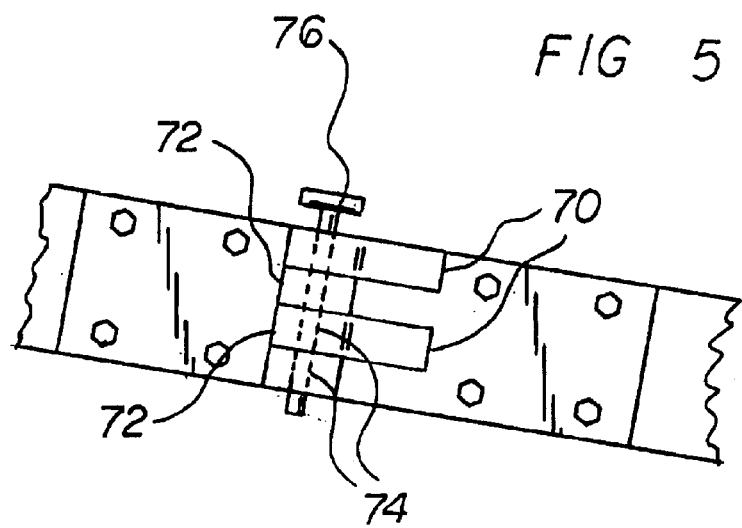
FIG. 5 is a bottom view of the hinge assembly taken along line 5—5 of FIG. 3.
Figure 6:
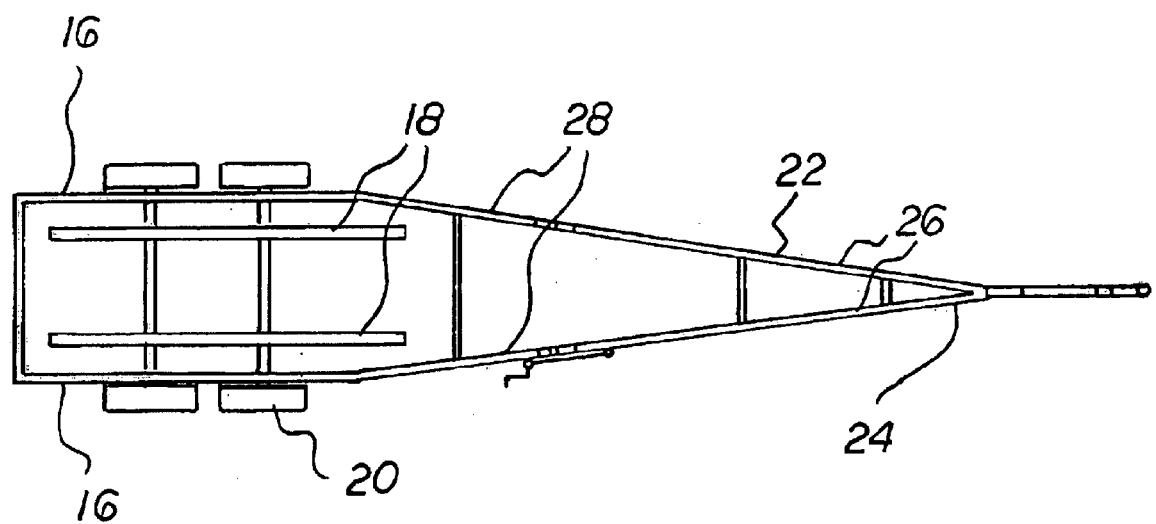
FIG. 6 is a plan view of the trailer system as appears in the prior figures.

With reference now to the drawings, and in particular to FIG. 1 thereof, the preferred embodiment of the new and improved collapsible boat trailer system embodying the principles and concepts of the present invention and generally designated by the reference numeral 10 will be described.

The present invention, the collapsible boat trailer system 10 for allowing a user to safely and conveniently reconfigure a boat trailer to a reduced size as for storage purposes is comprised of a plurality of components. Such components in their broadest context include a pair of angled forward rails, a pair of angled intermediate rails, and a pair of similarly configured hinge assembles. Such components are individually configured and correlated with respect to each other so as to attain the desired objective.

First provided is a trailer 12. The trailer has a rearward section 14 formed of parallel rearward rails 16 and with parallel supports 18 there above for receiving thereon a hull of a boat to be transported. Wheels 20 are provided beneath the rearward section or transportation purposes.

The trailer also has a forward section 22 in a V-shaped configuration terminating in an apex 24. The forward section is formed of a pair of angled forward rails 26 and a pair of angled intermediate rails 28 coupling the rearward rails and forward rails.

A downward projection 30 extends from the forward rails for support purposes and an upward projection 32 extends from the forward rails for boat-coupling purposes. A forward projection 34 extends from the forward rails for vehicle-coupling purposes.

The trailer has a forward end 36. The forward projection is adjacent the forward end. The trailer also has a rearward end 38. The parallel supports are adjacent the rearward end.

Next provided is a pair of similarly configured hinge assemblies 40. The hinge assemblies couple the forward rails and the intermediate rails respectively. Each hinge assembly includes a U-shaped channel 42 at the forward end of each intermediate rail and a U-shaped channel 44 at the rearward end of each forward rail. Each U-shaped channel has a horizontal upper piece 46 and a parallel lower piece 48 with a vertical coupling piece 50 there between. The coupling piece of each intermediate rail is in facing contact with the associated coupling piece of each forward rail when the trailer is configured for operation and use. Each hinge assembly has upwardly extending wings 52 on the upper piece of each intermediate rail with a bolt 54 there between and with a ball 56 positioned on the bolt between the wines. The hinge also includes a cylinder 58 secured to the upper piece of each forward rail. Each cylinder has a cylindrical opening 60 there through with an axis parallel with the axis of the rearward rail there adjacent. Each hinge assembly also has a connecting element 62 with an annular collar 64 pivotably received on the ball of the adjacent rearward rail and with a pin 66 extending into the cylindrical opening. In this manner the forward rails may pivot with respect to the intermediate rails of the forward section when moving between an operative orientation for transportation purposes and an inoperative orientation for storage purposes.

Next, a locking subassembly 68 is provided. The locking subassembly includes a plurality of downwardly projecting spaced forward plates 70 extending from each lower piece of each forward rail to a Location beneath each lower piece of each intermediate rail. A plurality of downwardly projecting spaced rearward plates 72 extend from each lower piece of each intermediate rail. The forward plates and rearward plates are interleaved when in the operative orientation. Apertures 74 are provided through all of the plates. The apertures are in alignment when the trailer is in the operative orientation. The locking subassembly also includes a pin 76 positionable through the apertures for locking the rails when in an operative orientation.

Finally, a winch 78 is provided. The winch is secured to, and above, one intermediate rail. A handle 80 is rotatable by a user. A cable 82 couples the winch to an intermediate point of one of the forward rails to facilitate the movement of the rails between the operative orientation and the inoperative orientation by the rotation of the handle.

Figure 7:
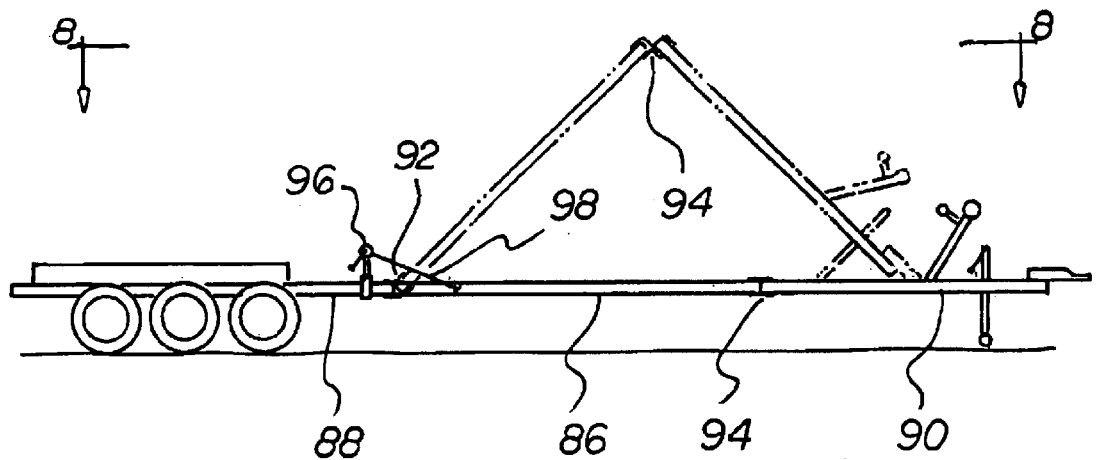
FIG. 7 is a side elevational view of the trailer configured with a pair of hinges.
Figure 8:
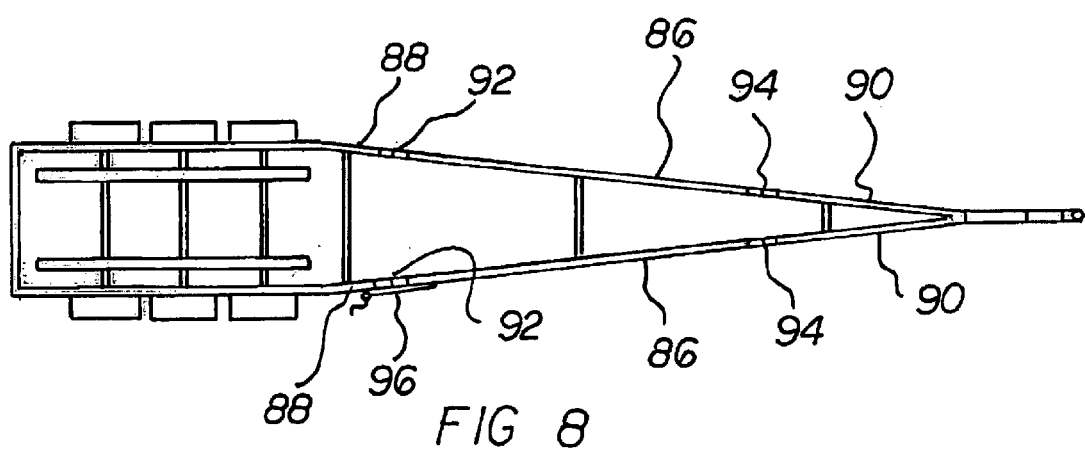
FIG. 8 is a plan view taken along line 8—8 of FIG. 7.

In the alternate embodiment of the invention, illustrated in FIGS. 7 and 8, supplemental angled rails 86 are located, between the intermediate rails 88 rearwardly and the forward rails 90 located forwardly. The supplemental rails each have an upper surface and a lower surface. The intermediate and forward rails each have an upper surface and a lower surface. In this embodiment, a pair of first hinges 92 is provided. Each of the first hinges couples the upper surfaces of the intermediate and supplemental rails. There is also provided a pair of second hinges 94. Each of the second hinges couples the lower surfaces of the supplemental and forward rails. This arrangement allows a bellows-like folding of the trailer rails. A winch 96 couples to one intermediate rail with a cable coupled to one forward rail.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and equivalent relationships to those illustrated in the drawing and described in the specification are intended to be encompassed by the present invention.

Therefore, the foregoing is considered as illustrative only of the principle of the invention. Further, since numerous modification and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A collapsible boat trailer system comprising:
a trailer having a forward portion with an upper surface and a rearward portion with an upper surface and an angled intermediate portion with an upper surface there between, with the forward portion being coupled to the angled intermediate portion by a hinging mechanism, the mechanism having a three dimensionally pivoting component, thereby allowing the upper surface of forward portion of the trailer to be folded upon the upper surface of the rearward portion of the trailer.

2. A collapsible boat trailer system as described in claim 1 wherein the hinge mechanism further comprises a locking component for locking the trailer in an operative orientation.

3. A collapsible boat trailer system comprising:
a trailer having parallel rearward rails and a pair of angled forward rails and a pair of angled intermediate rails; and
a pair of similarly configured hinge assemblies coupling the forward rails and the intermediate rails, each hinge assembly including upwardly extending wings on each intermediate rail with a bolt there between and with a ball positioned on the bolt between the wings, the hinge also including a cylinder with a cylindrical opening secured to each forward rail, each hinge assembly also having a connecting element with an annular collar pivotably received on the ball of the adjacent rearward rail and with a pin extending into the cylindrical opening whereby the forward rails may pivot with respect to the intermediate rails.

4. The system as set forth in claim 3 and further including a locking subassembly comprising a plurality of downwardly projecting spaced forward plates extending from each forward rail to a location beneath each intermediate rail and a plurality of downwardly projecting spaced rearward plates extending from each intermediate rail, the forward plates and rearward plates being interleaved when in the operative orientation, and with apertures through all of the plates, the apertures being in alignment when the trailer is in the operative orientation, the locking subassembly also including a pin positionable through the apertures for locking the rails when in an operative orientation.

5. The system as set forth in claim 3 and further including a removable winch which when not in use can be removed for storage, and when in use is secured to, and above, one intermediate rail with a handle rotatable by a user and a cable coupling the winch to an intermediate point of one of the forward rails to facilitate the movement of the forward rails between the operative orientation and the inoperative orientation by the rotation of the handle.

6. The system as set forth in claim 3 and further including supplemental angled rails having upper and lower surfaces, the supplemental rails being located between the intermediate rails rearwardly and the forward rails located forwardly, the intermediate and forward rails each having an upper surface and a lower surface, a pair of first hinges, each first hinge coupling the upper surfaces of the intermediate and supplemental rails and a pair of second hinges, each second hinge coupling the lower surface of the supplemental and forward rails, and a winch coupled to one intermediate rail with a cable coupled to one intermediate rail.

7. A collapsible boat trailer system for allowing a user to safely and conveniently reconfigure a boat trailer to a reduced size as for storage purposes comprising, in combination:
a trailer having a rearward section formed of parallel rearward rails and with parallel supports there above for receiving thereon a hull of a boat to be transported and with wheels there beneath for transportation purposes;

the trailer having a forward section in a V-shaped configuration terminating in an apex, the forward section being formed of a pair of angled forward rails and a pair of angled intermediate rails coupling the rearward rails and forward rails;

a downward projection extending from the forward rails for support purposes and an upward projection extending from the forward rails for boat-coupling purposes and a forward projection extending from the forward rails for vehicle-coupling purposes;

the trailer having a forward end with the forward projection there adjacent and a rearward end with the parallel supports there adjacent;

a pair of similarly configured hinge assemblies coupling the forward rails and the intermediate rails respectively, each hinge assembly including a U-shaped channel at the forward end of each intermediate rail and a U-shaped channel at the rearward end of each forward rail, each U-shaped channel having a horizontal upper piece and a parallel lower piece with a vertical coupling piece there between, the coupling piece of each intermediate rail being in facing contact with the associated coupling piece of each forward rail when the trailer is configured for operation and use, each hinge assembly having upwardly extending wings on the upper piece of each intermediate rail with a bolt there between and with a ball positioned on the bolt between the wings, the hinge also including a cylinder secured to the upper piece of each forward rail, each cylinder having a cylindrical opening there through with an axis parallel with the axis of the rearward rail there adjacent, each hinge assembly also having a connecting element with an annular collar pivotably received on the ball of the adjacent rearward rail and with a pin extending into the cylindrical opening whereby the forward rails may pivot with respect to the intermediate rails of the forward section when moving between an operative orientation for transportation purposes and an inoperative orientation for storage purposes;

a locking subassembly including a plurality of downwardly projecting spaced forward plates extending from each lower piece of each forward rail to a location beneath each lower piece of each intermediate rail and a plurality of downwardly projecting spaced rearward plates extending from each lower piece of each intermediate rail, the forward plates and rearward plates being interleaved when in the operative orientation, and with apertures through all of the plates, the apertures being in alignment when the trailer is in the operative orientation, the locking subassembly also including a pin positionable through the apertures for locking the rails when in an operative orientation; and a removable winch which can be removed for storage when not in use, and when in use is secured to, and above, one intermediate rail with a handle rotatable by a user and a cable coupling the winch to an intermediate point of one of the forward rails to facilitate the movement of the rails between the operative orientation and the inoperative orientation by the rotation of the handle.

* * * * *